Oct. 16, 1951  H. C. LAWRENCE, JR., ET AL  2,571,458
TEMPERATURE COMPENSATED DIODE MEASURING CIRCUITS
Filed Jan. 6, 1948
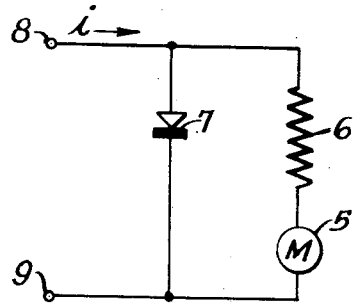
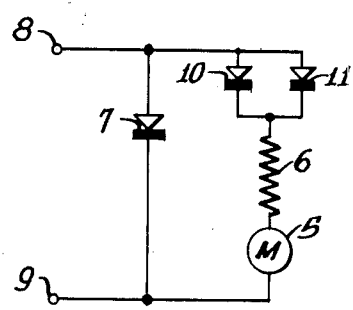
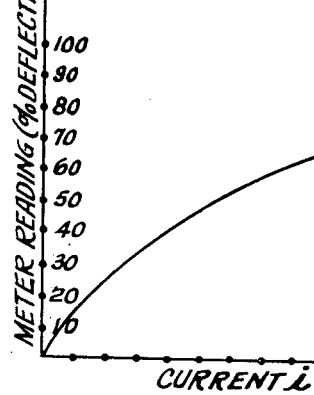
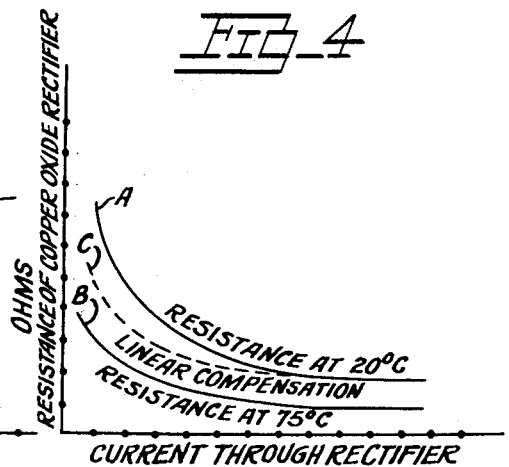
Inventors:
Howard C. Lawrence, Jr
& Robert R. Freas, Jr
BY
Condor C. Henry
ATTORNEY Patented Oct. 16, 1951

2,571,458

UNITED STATES PATENT OFFICE 2,571,458

TEMPERATURE COMPENSATED DIODE MEASURING CIRCUITS

Howard C. Lawrence, Jr., Delaware Township, Camden County, N. J., and Robert R. Freas, Jr., Jermyn, Pa., assignors to Radio Corporation of America, a corporation of Delaware Application January 6, 1948, Serial No. 726

7 Claims. (Cl. 171—95)

This invention relates to electrical measuring apparatus and more particularly to electrical measuring apparatus wherein rectifiers are employed in conjunction with a linear instrument to produce a non-linear scale deflection.

In many instances, in the electrical measuring art, such as in resistance measurements, it is desirable to use an indicating instrument having a non-linear response characteristic.

It is well known in the art that dry disk rectifiers, such as copper oxide rectifiers, have the property of decreasing resistance with increasing current density; this will be referred to as the rectifier current characteristic.

Due to this current characteristic, a non-linear indication can be produced by placing such a rectifier in parallel with a linear type instrument, such as a direct current instrument of the d'Arsonval type. However, this circuit is seriously sensitive to changes of temperature and is useful only in the laboratory or where the temperature is maintained substantially constant. Use of this circuit for producing a non-linear indication, in portable equipment or that which must be operated out of doors, at temperatures as high as 75° C. and as low as −50° C. results in errors in readings in the order of three to one.

It is an object of our invention to provide a simple, easily constructed circuit to compensate for the inaccuracy of electrical meter deflections due to temperature variations.

It is a further object of our invention to provide a temperature compensating circuit easily calibrated to maintain accurate scale deflections under different temperature conditions.

According to our invention we provide a novel circuit arrangement comprising a dry disk rectifier element in series with the conductive member of a direct current electrical indicating instrument. In parallel with the above series arrangement is connected a second dry disk rectifier element having the same polarity as the first rectifier element, across which is provided a pair of electrical terminals.

By means of the foregoing arrangement we have been able to provide a current responsive device to indicate electrical phenomena, having a non-linear scale deflecting and having satisfactory temperature characteristics.

The organization and method of operation, together with additional objects and advantages thereof will be apparent from the following description when read in connection with the accompanying drawing, in which is shown schematically a specific embodiment of my invention.

In the accompanying drawings, forming a part of this application, and in which like numerals are employed to designate like parts throughout the same—

Figure 1 is a diagrammatic representation of a non-linear type measuring circuit;

Figure 2 is a diagrammatic representation of a modified type of non-linear rectifier measuring instrument arranged in accordance with our invention;

Figure 3 is a graphical representation showing the characteristic scale deflection of a non-linear rectifier measuring instrument of the type shown schematically in Figure 1, and, Figure 4 is a graphical representation showing a comparison of the resistance current characteristics of a dry disk rectifier element at different temperatures.

Referring to Figure 1, the apparatus shown comprises a linear type direct current indicating instrument 5 connected in series with a limiting resistor 6. In shunt with this series arrangement is connected a rectifier element 7 of the dry disk type, across which are provided the terminals 8 and 9. A voltage applied between these terminals causes a current, $i$, to flow into the circuit. This current is distributed between the branch containing the indicating instrument and the branch containing the rectifier element.

Due to the aforementioned property of the rectifier element, the ratio of the current in the rectifier branch to the current in the indicating instrument branch will increase as the total current in the circuit increases. That is, as the total current increases, the rectifier element shunts an increasing proportion of the total current, causing the meter reading (percent deflection vs. the total current) to appear as shown in Figure 3. It will be noted that for increasing values of total current the increase in deflection becomes less for a uniform increment of total current, thereby giving what approaches a logarithmic type of scale.

The above described circuit has serious temperature restrictions because of the nature of the temperature coefficient of the rectifier element. Figure 4 shows a plot of the resistance of a copper oxide rectifier vs. current through the rectifier at two different temperatures in which curve A represents resistance at 20° C. and curve B represents resistance at 75° C. It will be noted that at 20° C. the resistance is considerably greater for all values of current than it is at 75° C. Furthermore, the two resistance curves do not differ by a constant value, but approach one another at greater current densities.

This property of the rectifier element of decreasing resistance with increasing current density prohibits the use of conventional compensating resistors having a high negative temperature coefficient, as their resistance is substantially dependent upon temperature alone. The use of conventional compensating resistors could, at best, cause only a simple vertical displacement of the resistance curves. This is illustrated by the dotted line C in Figure 4. Curve B may be raised by this method, but this does not bring the curves A and B into coincidence, which is required for ideal temperature compensation.

Our invention utilizes rectifier elements, of the same type as used to obtain the non-linear characteristic and in the same polarity as the shunt rectifier element, for temperature compensation. Referring to Figure 2, there is provided a parallel arrangement of two rectifier elements 10 and 11 in series with a limiting resistor 6, and a linear type electrical indicating instrument 5. The rectifier element 7 is connected in shunt, and in the same polarity as the temperature compensating elements, across the series arrangement of the temperature compensating elements, the limiting resistor, and the indicating instrument. Input to this circuit is provided by a pair of terminals 8 and 9 connected to opposite ends of the rectifier element 7.

The ratio of the apparent contact area in the non-linear forming rectifier element 7 to that in the compensating rectifier element 10 must be so chosen that the non-linear current characteristic of the compensating rectifier is not detrimental to the performance of the circuit. This is accomplished by using a considerably greater area in the compensating rectifier than in the non-linear forming rectifier. The larger area in the compensating rectifier can be readily effected by any suitable means such as one rectifier having a greater area, however, we prefer to provide this larger area by utilizing two or more rectifier elements in parallel. Since the limiting resistance is the major factor of impedance in the arm of the circuit containing the instrument, the limiting resistance, and the compensating rectifier, placing two rectifier elements in parallel has little effect on the total impedance of this arm of the circuit, and a greater contact area in the rectifier elements is provided for substantially the same value of current.

In this way the current density in the compensating rectifier is maintained at a lower value than the current density of the non-linear forming rectifier. Due to the lower value of current density in the compensating rectifier, changes in the total current have only a small effect upon the resistance; and the non-linear characteristic as shown by Figure 3 is impaired to only a minor degree. As each of the two parallel branches contains rectifier elements, having like temperature coefficients, a change in temperature will effect an equal change in resistance in each branch, thus the ratio of the currents in the two branches is maintained dependent upon the value of total current and not effected by temperature change.

It is to be understood that the form of our invention, herewith shown and described, is to be taken as a preferred example of the same, and that various changes in the shape, size and arrangement of parts may be resorted to, without departing from the spirit of our invention, or the scope of the subjoined claims.

Having thus described our invention, we claim:

1. An electrical measuring apparatus comprising, in combination, an input means, a current responsive device, a first rectifier element having a predetermined area connected in series between said input means and said current responsive device, and a second rectifier element having an area smaller than the first rectifier element connected in shunt and in the same polarity as said first rectifier element across the combination of said first rectifier element and said device, whereby the resistance across the second rectifier will be high while the voltage across it is low and the resistance across it will be low as such voltage increases.

2. An electrical measuring apparatus comprising, in combination, an input means, a current responsive device, a first dry disk rectifier element having a predetermined area connected in series between said input means and said current responsive device, and a second dry disk rectifier element having an area smaller than the first rectifier element connected in shunt and in the same polarity as said first rectifier element across the combination of said first dry disk rectifier element and said device, whereby the resistance across the second rectifier will be high while the voltage across it is low and the resistance across it will be low as such voltage increases.

3. An electrical measuring apparatus comprising, in combination, an input means, two rectifier elements, each having the properties of decreasing resistance with increasing current density and decreasing resistance with increasing temperature, a current responsive device, the first of said rectifier elements connected in series between said input means and said current responsive device, the second of said rectifier elements connected in shunt and in the same polarity as said first rectifier element, having an area smaller than the first rectifier element across the combination of said first rectifier element and said device, whereby the resistance across the second rectifier will be high while the voltage across it is low and the resistance across it will be low as such voltage increases.

4. An electrical measuring apparatus comprising, in combination, an input means, a first rectifier element, a second rectifier element said first rectifier element having an area equal to or greater than twice the area of said second rectifier element, and a current responsive device, the first of said rectifier elements connected in series between said input means and said current responsive device, the second of said rectifier elements connected in shunt and in the same polarity as said first rectifier element across the combination of said first rectifier element and said device, whereby the resistance across the second rectifier will be high while the voltage across it is low and the resistance across it will be low as such voltage increases.

5. An electrical measuring apparatus comprising, in combination, an input means, a current responsive device, a plurality of rectifier elements having a predetermined area arranged in parallel in the same polarity and connected in series with said input means and said device, and an additional rectifier having an area smaller than the first rectifier element connected across said input means in the same polarity as said parallel arrangement of rectifier elements and in parallel with the first said rectifiers and said device, whereby the resistance across the second rectifier will be high while the voltage across it is low and the resistance across it will be low as such voltage increases.

6. An electrical measuring apparatus comprising, in combination, an input means, a current responsive device, a first copper oxide rectifier element having a predetermined area connected in series between said input means and said current responsive device and a second copper oxide rectifier element having an area smaller than the first element in shunt and in the same polarity as the said first element across the combination of said first element and said device.

7. An electrical measuring apparatus comprising, in combination, an input means, two rectifier elements, each having the properties of decreasing resistance with increasing current density and decreasing resistance with increasing temperature, the first of said rectifier elements having an area equal to or greater than twice the area of the second of said rectifier elements, the first of said rectifier elements connected in series between said input means and said current responsive device, the second of said rectifier elements connected in shunt and in the same polarity as said first rectifier element across the combination of said first rectifier element and said device.

HOWARD C. LAWRENCE, Jr.
ROBERT R. FREAS, Jr.

REFERENCES CITED

The following references are of record in the file of this patent:

UNITED STATES PATENTS

| Number | Name | Date |
|---|---|---|
| 2,452,551 | Conant | Nov. 2, 1948 |
| 2,465,683 | Greisheimer | Mar. 29, 1949 |

FOREIGN PATENTS

| Number | Country | Date |
|---|---|---|
| 404,498 | Great Britain | Jan. 18, 1934 |
| 699,956 | Germany | Dec. 10, 1940 |

OTHER REFERENCES

Publication, "Instrument Rectifiers," by H. B. Conant, Conant Electrical Laboratories, Lincoln, Nebr. Copyright 1945.